US008651608B2

(12) United States Patent
Miller et al.

(10) Patent No.: US 8,651,608 B2
(45) Date of Patent: *Feb. 18, 2014

(54) FIFO METHODS, SYSTEMS AND APPARATUS FOR ELECTRONICALLY REGISTERING IMAGE DATA

(75) Inventors: Kenneth R. Miller, Macedon, NY (US); Jess R. Gentner, Rochester, NY (US); James D. Shoots, Victor, NY (US); Mark Vandellon, Webster, NY (US); Robert P. Loce, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 484 days.

This patent is subject to a terminal disclaimer.

(21) Appl. No.: 12/977,279

(22) Filed: Dec. 23, 2010

(65) Prior Publication Data
US 2011/0254889 A1     Oct. 20, 2011

Related U.S. Application Data

(60) Provisional application No. 61/334,706, filed on May 14, 2010, provisional application No. 61/324,960, filed on Apr. 16, 2010.

(51) Int. Cl.
*B41J 29/38* (2006.01)

(52) U.S. Cl.
USPC ................................................. 347/14; 347/9

(58) Field of Classification Search
USPC .......................................................... 347/14
See application file for complete search history.

(56) References Cited

U.S. PATENT DOCUMENTS

| 4,203,154 | A | * | 5/1980 | Lampson et al. ............... 345/26 |
| 5,430,472 | A | | 7/1995 | Curry |
| 5,477,243 | A | * | 12/1995 | Tamura .......................... 347/12 |
| 5,732,162 | A | | 3/1998 | Curry |
| 6,246,396 | B1 | * | 6/2001 | Gibson et al. ................. 345/604 |
| 8,400,678 | B2 | * | 3/2013 | Loce et al. ..................... 358/1.9 |
| 2003/0175602 | A1 | | 9/2003 | Kazama |
| 2006/0092264 | A1 | | 5/2006 | Matsuzaki et al. |
| 2007/0165283 | A1 | | 7/2007 | Matsuzaki et al. |
| 2009/0034007 | A1 | | 2/2009 | Sano et al. |

OTHER PUBLICATIONS

U.S. Appl. No. 61/334,706, filed May 14, 2010, Miller et al.
U.S. Appl. No. 61/324,960, filed Apr. 16, 2010, Loce et al.
U.S. Appl. No. 12/894,442, filed Sep. 30, 2010, Loce et al.

* cited by examiner

*Primary Examiner* — Manish S Shah
*Assistant Examiner* — Jeffrey C Morgan
(74) *Attorney, Agent, or Firm* — Fay Sharpe LLP

(57) ABSTRACT

Disclosed are FIFO type methods, systems and apparatus for electronically registering image data relative to a rastering device or other marking device. According to an exemplary method, a FIFO type data queuing configuration is provided, where the length of data memory segments associated with the FIFO are a function of a spatial profile associated with the ink jet rastering device.

25 Claims, 12 Drawing Sheets

FIFO METHODS, SYSTEMS AND APPARATUS FOR ELECTRONICALLY REGISTERING IMAGE DATA

This application claims the benefit of priority to U.S. Provisional Application No. 61/334,706, filed May 14, 2010, entitled FIFO METHODS, SYSTEMS AND APPARATUS FOR ELECTRONICALLY REGISTERING IMAGE DATA," by Miller et al. and U.S. Provisional Application No. 61/324,960, filed Apr. 16, 2010, entitled "FIFO METHODS, SYSTEMS AND APPARATUS FOR ELECTRONICALLY REGISTERING IMAGE DATA" by Loce et al., each of which is hereby incorporated by reference in their entirety.

CROSS REFERENCE TO RELATED PATENTS AND APPLICATIONS

U.S. patent application Ser. No. 12/894,442, filed Sep. 30, 2010, entitled "FIFO METHODS, SYSTEMS, AND APPARATUS FOR ELECTRONICALLY REGISTERING IMAGE DATA," by Robert P. Loce et al., is incorporated herein by reference in its entirety.

BACKGROUND

This disclosure generally relates to electronic registration and, more particularly, to a system to improve image registration by electronic compensation of raster output scanner beam scan trajectory distortions associated with a xerographic printer, and staggered print head configurations associated with an ink jet printer.

Electrophotographic marking is a well-known and commonly used method of copying or printing documents. In general, electrophotographic marking employs a charge-retentive, photosensitive surface, known as a photoreceptor, that is initially charged uniformly. In an exposure step, a light image representation of a desired output focused on the photoreceptor discharges specific areas of the surface to create a latent image. In a development step, toner particles are applied to the latent image, forming a toner or developed image. This developed image on the photoreceptor is then transferred to a print sheet on which the desired print or copy is fixed.

The electrophotographic marking process outlined above can be used to produce color as well as black and white (monochrome) images. Generally, color images can be produced by repeating the electrophotographic marking process to print two or more different image layers or color image separations in superimposed registration on a single print sheet. This process may be accomplished by using a single exposure device, e.g. a raster output scanner (ROS), where each subsequent image layer is formed on a subsequent pass of the photoreceptor (multiple pass) or by employing multiple exposure devices, each writing a different image layer, during a single revolution of the photoreceptor (single pass). While multiple pass systems require less hardware and are generally easier to implement than single pass systems, single pass systems provide much greater print speeds.

In generating color images, the ability to achieve precise registration of the image layers is necessary to obtain printed image structures that are free of undesirable color fringes and other registration errors. Precise registration of image layers in a single pass machine requires precise registration from one ROS to the next. One major cause of misregistration in multiple ROS systems is the differences in the beam scan trajectory of each ROS in the imaging system.

In general, a conventional ROS repeatedly scans a data modulated light beam over a photoreceptor surface in accordance with a predetermined raster scanning pattern to generate an image. Typically, a conventional ROS includes a laser diode or similar device to generate a light beam that is modulated in response to received data. The ROS further includes a rotating polygonal mirror block to repeatedly scan the light beam across the photoreceptor. As the photoreceptor is advanced in a process direction, the ROS repeatedly scans the modulated light beam across the surface of the photoreceptor in a fastscan direction that is orthogonal to the process direction.

Ideally, each scan of the light beam across the photoreceptor (generally identified herein as a beam scan) traces a straight line across the surface of the photoreceptor that is substantially normal to the movement of the photoreceptor in the process direction. Typically, each ROS introduces different pixel positioning errors that distort its beam scan. Thus, in a machine with more than one ROS, each ROS will likely have a different beam scan trajectory. However, alignment of the ROS to the photoreceptor and non ideal optical components can curve the scan line in shapes, such as parabolic, which contributes to process-direction distortion (slow scan). Furthermore, variations in the angular speed of the rotating polygonal mirror can contribute to distortion in the cross-process direction (fast scan). This disclosure, and the exemplary embodiments described herein, are primarily directed to compensating for distortion in the process direction.

To achieve the color to color registration necessary to generate color images that are free of undesirable registration errors, the beam scan trajectory of each ROS must be within a relatively tight bound such that all scan trajectories are within a 50 micron envelope. Such tight registration tolerances are very difficult and very expensive to achieve solely by opto-mechanical means within the ROS. Systems for compensation and/or correction of beam scan distortions to improve registration errors have been proposed. However, many of these proposed systems correct only one type of distortion and often are themselves complex and expensive to implement. This disclosure also applies to controlling image-to-paper registration. Image-to-paper registration issues can occur in several possible scenarios. One concerns side 1 and side 2 registration in duplex printing. For example, the paper in one or both of the printing steps can be skewed in some predictable way. If this skew is not compensated for, any marks attempted to be printed at the same positions of both side 1 and side 2 will be unsuccessful. Another scenario relates to the relative placement of a marked image relative to the paper borders. Any misalignment of the marked image resulting from uncompensated paper skew will manifest itself as an improperly aligned image, relative to the paper borders. The presently disclosed embodiments can be used to skew the image in a like manner so that its position on the paper is not skewed, and the position of side 1 and side 2 are not skewed relative to each other for duplex printing.

Another well known and commonly used method of printing documents is ink jet printing. In contrast to xerographic printing as described above, ink jet printing utilizes multiple print heads including rows and columns of ink jets to make an image on a media substrate. As in the case of xerographic printing, ink jet printing systems need to achieve precise registration of image layers to obtain printed image structures that are free of undesirable color fringes and other registration errors. Notably, color inkjet systems can include staggered print head/jet configurations where the leads/jets may be staggered in the process direction by 12 inches or more.

In order to achieve precise pixel-to-pixel registration of printed pixel produced by the various jets and inkjet print heads, and achieve precise registration between image layers, print head/jet process direction offsets associated with the staggered configuration must be compensated for, as well as ink jet offsets within each print head.

The following references may be found relevant to the present disclosure.

U.S. Pat. No. 5,430,472 to Curry discloses a method and apparatus for eliminating misregistration and bowing by controlling a composite light intensity profile and phase shifting of a spatial location at which the light intensity profile crosses a xerographic threshold in a two dimensional high addressability printer operating in an overscan mode.

U.S. Pat. No. 5,732,162 to Curry discloses a system for correcting registration errors in a printer with subscan precision. The system includes a memory device for storing sequential rasters of image data and an interpolator coupled to the memory device. The interpolator uses the rasters of image data from the memory device in conjunction with multiplication factors to calculate an interpolated resample value.

INCORPORATION BY REFERENCE

Kazama, "IMAGE FORMING METHOD," Patent Application Publication No. US 2003/0175602A1, published Sep. 18, 2003.

Y. Matsuzaki, et al, "IMAGE FORMING APPARATUS AND IMAGE FORMING METHOD," Patent Application Publication No. US 200610092264A1, published May 4, 2006.

Y. Matsuzaki, et al, "IMAGE FORMING APPARATUS, IMAGE PROCESSING METHOD THEREOF, AND STORAGE MEDIUM STORING PROGRAM FOR IMAGE PROCESSING," Patent Application Publication No. US 2007/0165283, published Jul. 19, 2007.

Sano et al., "IMAGE FORMING APPARATUS AND IMAGE CORRECTION METHOD," Patent Application Publication No. US 2009/0034007A1, published Feb. 5, 2009.

BRIEF DESCRIPTION

In one embodiment of this disclosure, described is a method of electronically registering a rasterized image relative to a spatial profile of an ink jet rastering device, the method comprising: a) receiving rasterized pixel line data for rendering on a substrate; b) sequentially extracting one or more lines of the rasterized pixel line data to fill a FIFO type data queuing configuration including a plurality of FIFO type data memory segments, each data memory segment including a FIFO type data input which is filled by pixel line data associated with the last pixel line extracted from the rasterized pixel line data, a FIFO type data memory output associated with the oldest pixel line data of the respective data segment, and a predetermined number of FIFO type sequential data storage positions between the FIFO type data input and FIFO type data output, wherein the predetermined number of FIFO type sequential data storage positions is a function of the spatial profile of the physical rastering device; c) outputting the rasterized pixel line data associated with the data memory segment FIFO type outputs to one of the ink jet rastering devices for rendering the image on the substrate, a process for further image processing and a device for further image processing; and d) sequencing in a FIFO manner the relative positions of the pixel line data associated with the plurality of data memory segments and repeating steps step b) and c).

In another embodiment of this disclosure, described is a printing apparatus for rendering an image on a substrate, the printing apparatus comprising: an EIP (Electronic Image Path) configured to receive rasterized pixel line data for rendering the image on the substrate; an ink jet rastering device configured to mark the substrate with the image, the ink jet rastering device including a plurality of ink jets arranged in a respective plurality of columns and rows to provide a spatial profile; and a controller operatively connected to the EIP and the ink jet rastering device, the controller configured to perform a process of electronically registering the rasterized image relative to the spatial profile of the ink jet rastering device, the process comprising: a) sequentially extracting one or more lines of the rasterized pixel line data to totally fill a FIFO type data queuing configuration including a plurality of FIFO type data memory segments associated with the plurality of ink jets, each data memory segment including a FIFO type data input which is filled by pixel line data associated with the last pixel line ink jet and extracted from the rasterized pixel line data, a FIFO type data output associated with the oldest pixel line data of the respective data memory segment, and a predetermined number of FIFO type sequential data storage positions between the FIFO type data input and FIFO type data output, wherein the predetermined number of FIFO type sequential data storage positions is a function of the spatial profile of the ink jet rastering device; b) after the FIFO type data queuing configuration is full, outputting the rasterized pixel line data associated with the data memory segment FIFO type outputs to the ink jet rastering device for rendering the image onto the substrate; and c) sequencing in a FIFO manner the relative positions of the pixel line data associated with the plurality of data memory segments and repeating steps step a) and b).

In still another embodiment of this disclosure, described is a printing apparatus controller comprising: a computer-usable data carrier storing instructions that, when executed by the controller cause the controller to perform a method of electronically registering a rasterized image relative to a spatial profile of an ink jet rastering device, the ink jet rastering device including a plurality of ink jets arranged in a respective plurality of columns and rows to provide the spatial profile method comprising: a) receiving rasterized pixel line data for rendering on a substrate; b) sequentially extracting one or more lines of the rasterized pixel line data to totally fill a FIFO type data queuing configuration including a plurality of FIFO type data memory segments associated with the plurality of ink jets, each data segment associated with a respective ink jet and including a FIFO type data input which is filled by pixel line data associated with the last pixel line extracted from the rasterized pixel line data, a FIFO type data output associated with the oldest pixel line data of the respective data memory segment, and a predetermined number of FIFO type sequential data storage positions between the FIFO type data input and FIFO type data output, wherein the predetermined number of FIFO type sequential data storage positions is a function of the spatial profile of the ink jet rastering device; c) after the FIFO type data queuing configuration is full, outputting the rasterized pixel line data associated with the data memory segment FIFO type outputs to the ink jet rastering device for rendering the image on the substrate; and d) sequencing in a FIFO manner the relative positions of the pixel line data associated with the plurality of data memory segments and repeating steps step b) and c).

DETAILED DESCRIPTION

Figure 1:
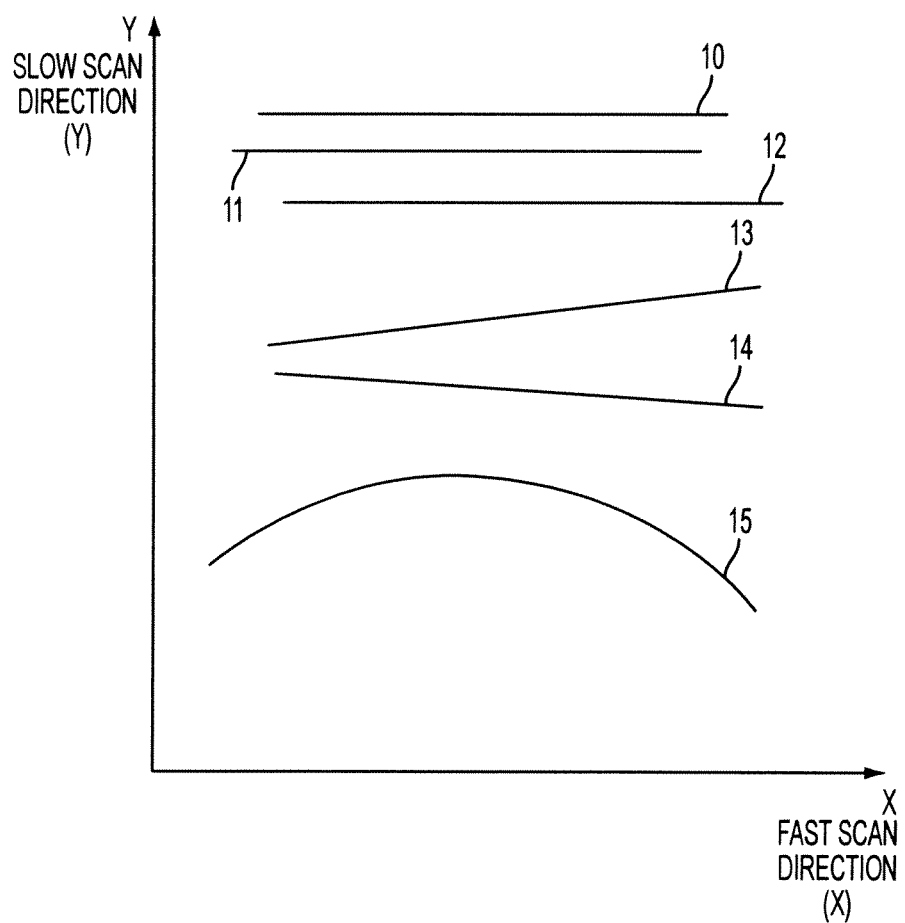
FIG. 1 illustrates four common types of ROS beam scan trajectory distortions that can be compensated for by the present disclosure.

For a general understanding of the present disclosure, reference is made to the drawings. In the drawings, like reference numerals have been used throughout to designate identical elements. In describing the present disclosure, the following terms have been used in the description.

A "beam scan" identifies one pass of a modulated light beam output from a ROS across a photoreceptor. The "beam scan trajectory" identifies the trace or path of a beam scan across the surface of the photoreceptor.

"Fast Scan" is the nominal direction of the trajectory of the beam scan or orientation of the ink jet raster.

"Slow Scan" is the direction of the printing process, which is the direction of the medium that the ROS or ink jet print head is writing onto. It is substantially perpendicular to the fast scan direction.

"Physical Raster" is a physical manifestation of a raster of data, such as exposure line written by a ROS or ink line written by an inkjet head. The image writing device, such as a ROS or an inkjet head, is a rastering device that converts raster data to a physical raster on a physical medium.

The presently disclosed embodiments may be used for processing continuous tone (contone) image data, as well as binary image data. Moreover, it should be understood that the present disclosure applies equally well to the processing of color and monochrome images. Accordingly, any references herein to the processing of images are intended to include the processing of monochrome and color image separations. Contone image data comprises a plurality of scanlines each of which further comprises a plurality of multi-bit digital pixels. Each beam scan across the photosensitive surface by a ROS requires one scanline to modulate the light beam. For each pixel within a scanline, the ROS may write one or more spots on the photosensitive surface. In comparison, binary image data can be used by many printers to achieve the best image quality by writing using saturation conditions, that is, using the laser at zero exposure or high exposure that drives the charged photoreceptor down to a residual voltage. Writing in this manner tends to produce prints with less noise, more density uniformity across a page, and better density stability for prints made over a duration of time, compared to driving the laser directly with contone values. Thus, many printers do not directly vary the laser power with a pixel's contone value. Rather, an image processing method such as thresholding, halftoning or error diffusion is often used to convert the contone pixel values to binary values. The binary values then drive the laser at the two exposure levels.

The present disclosure, according to a first aspect, is described herein as compensating for distortions in the beam scan trajectory of a ROS. As used herein, distortion in a beam scan trajectory (beam scan trajectory distortion) refers to the geometric displacement of the pixel positions along the beam scan trajectory from the pixel positions along a reference beam scan trajectory. The reference beam scan trajectory may be any desired beam scan trajectory including the beam scan trajectory of a given ROS. It should be understood that compensating for distortions in the beam scan trajectory of a ROS is intended to cover removing distortions within the beam scan trajectory of the ROS such that the trajectory of the ROS matches that of a given ROS or reference beam scan line. Furthermore, it should be understood that removing distortions in the beam scan trajectory of a ROS to match the trajectory of one ROS to that of another is intended to cover removing pixel positioning errors in the beam scan trajectory as well as introducing pixel positioning errors into the beam scan trajectory.

To begin by way of general explanation, four common types of pixel positioning errors which distort ROS beam scan trajectories are illustrated in FIG. 1. Although the four types of distortions described below are shown separately for illustrative purposes, it is understood that beam scan trajectory can be distorted by any combination of one or more of the four types illustrated in FIG. 1. Each referenced line in FIG. 1 illustrates the trajectory of a beam scan across a photoreceptor in the fastscan (X) direction. Beam scan trajectories 10-12 illustrate a first type of distortion in which the placement of the beam scans associated with multiple ROSes are offset in the fastscan and/or process direction. As can be seen, each of the trajectories 10-12 has a slightly different starting point in the fastscan direction. Similarly, the position of beam scan trajectory 11 is offset in the process (Y) direction such that the position of the beam scan is shifted toward beam scan trajectory 10.

A second type distortion is known as skew. With beam scan skew, some beam scans are generated at a slight angle with respect to other beam scans (or reference trajectory). Skew can be seen with beam scan trajectories 13 and 14, which are generated at a slight angle with respect to trajectories 10-12 as well as relative to each other. In a third beam scan distortion, referred to as bow, the trajectory of the beam scan is curved as illustrated by trajectory 15.

Figure 2:
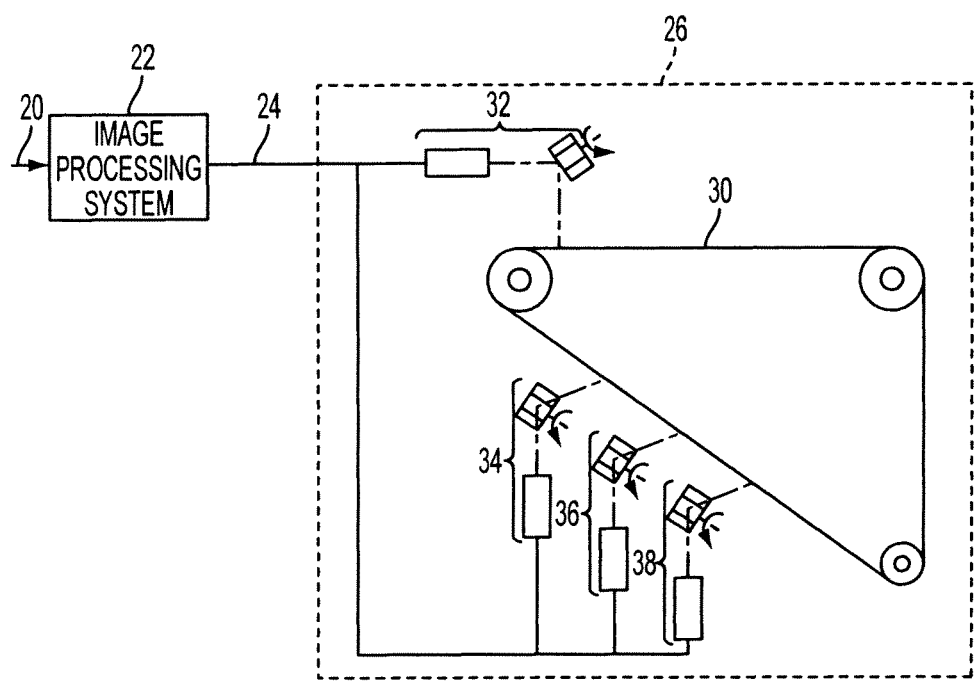
FIG. 2 is a schematic, elevational view of a printing apparatus according to an exemplary embodiment of this disclosure.

Turning now to FIG. 2, there is shown an embodiment of a printing machine 26 including a digital imaging system that incorporates the features of the present disclosure. Image data 20 representing an image to be printed is received by an image processing system (IPS) 22 that may incorporate what is known in the art as a digital front end (DFE). IPS 22 processes the received image data 20 to produce print ready binary data 24 that is supplied to a print engine 26. Notably, IPS 22 may receive image data 20 from any image data source, for example, but not limited to, an input scanner which captures an image from an original document, a computer, a camera, a network, or any similar or equivalent image input terminal communicating with the imaging system.

Print engine 26 is beneficially an electrophotographic engine; however, it will become evident from the following discussion that the present disclosure is useful in a wide variety of copying and printing machines and is not limited in its application to the printing machine shown herein. Print engine 26 is shown as a multi-ROS engine which operates on the print ready binary data from IPS 22 to generate a color document in a single pass on a charge retentive surface in the form of photoreceptor belt 30. Briefly, the uniformly charged photoreceptor 30 is initially exposed to a light image which represents a first color image separation, such as black, at ROS 32. The resulting electrostatic latent image is then developed with black toner particles to produce a black toner image. This same image area with its black toner layer is then recharged, exposed to a light image which represents a second color separation such as yellow at ROS 34, and developed to produce a second color toner layer. This recharge, expose and develop image-on-image (REaD IOI) process may be repeated at ROS 36 and ROS 38 to subsequently develop image layers of different colors, such as magenta and cyan.

The present disclosure and exemplary embodiments included herein is directed towards aspects of IPS 22 depicted in FIG. 2. In particular, the intention of the present disclosure is directed to the inclusion of a process to electronically register (ER) a data representation of an image relative to a spatial profile of a physical raster within IPS 22. The ER process compensates for ROS beam scan trajectory distortions and improves image layer registration such that color image separations print in register when written with one or more laser scanners possessing different beam scan trajectory characteristics. For an image-on-image (IOI) printing system, IPS 22 processes image data such that each ROS appears to have written the image using the same beam scan trajectory. Alternatively, IPS 22 may process the image data such that the image appears to have been written such that the beam scan trajectory of each "color" ROS matches the beam scan trajectory of the black ROS. Not ER processing the black image separation provides the advantage of obtaining precise registration of the image separations without generating unwanted artifacts that may arise when ER processing the black separation.

Existing Electronic Registration methods as disclosed in Kazama, "IMAGE FORMING METHOD," Patent Application Publication No. US 2003/0175602A1, published Sep. 18, 2003 and Y. Matsuzaki, et al, "IMAGE FORMING APPARATUS AND IMAGE FORMING METHOD," Patent Application Publication No. US 2006/0092264A1, published May 4, 2006, or other related methods (see Y. Matsuzaki, et al., "IMAGE FORMING APPARATUS, IMAGE PROCESSING METHOD THEREOF, AND STORAGE MEDIUM STORING PROGRAM FOR IMAGE PROCESSING," Patent Application Publication No. US 2007/0165283, published Jul. 19, 2007 and Sano et al., "IMAGE FORMING APPARATUS AND IMAGE CORRECTION METHOD," Patent Application Publication No. US 2009/0034007A1, published Feb. 5, 2009) require high speed scan line buffers to span the range of raster line bow and skew being compensated. This disclosure and the exemplary embodiments included herein provide ER methods, systems and apparatus to potentially reduce the cost of expensive high speed scan line buffering.

The present disclosure, according to the first aspect, is directed to a memory architecture for efficiently storing and using raster data for slow scan ER applications. To understand the value of the disclosure, consider that current ER methods store data that has been used and is no longer needed due to the spatial profile of the physical raster. The present exemplary method utilizes FIFO (First In First Out type data queuing where data memory segments of differing lengths hold raster data. It is to be understood that the term FIFO as used throughout this disclosure includes any FIFO type data queuing arrangement which may be, but not limited to, a FIFO memory device implemented in hardware and/or software, a data queuing algorithm implemented in hardware and/or software, etc. The FIFO length for a pixel column corresponds to the number of raster lines from the most upstream point of the physical raster to the point where the given pixel column intersects the physical raster profile. Data at the end of each FIFO is used to fill a raster line buffer that will be written by the physical rastering device. According to some embodiments of this disclosure, the collection of FIFOs has a wedge shape for skew applications, parabolic shape for bow applications, and approximate combination of those shapes for other general applications. The exemplary methods, systems and apparatus work with contone or binary ER implementations. If used with a contone method and binary imager, binary output pixels can be generated from the raster line(s) extracted from the end of the FIFOs. The ER method reduces scan line memory requirements by 2× for skew applications according to an exemplary embodiment.

Figure 3:
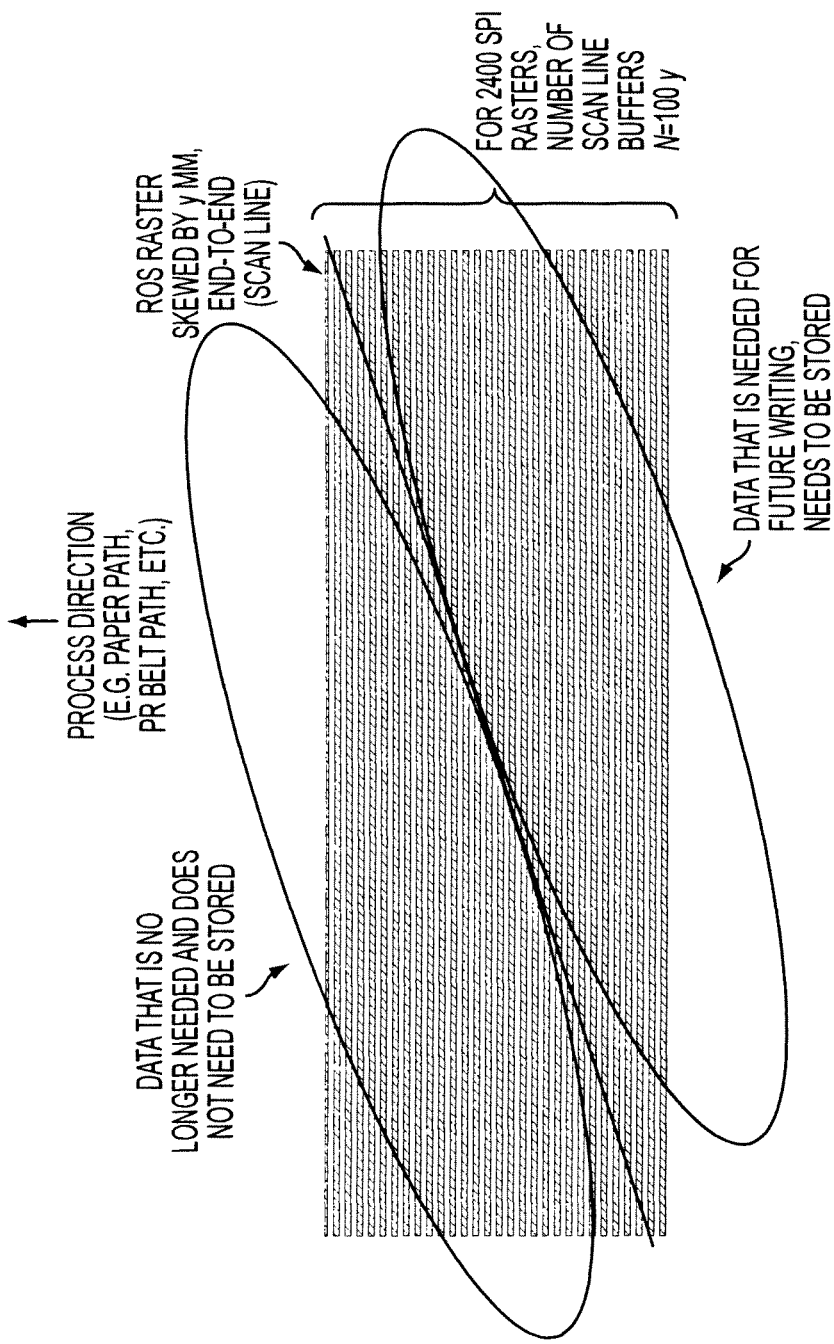
FIG. 3 is a schematic illustrating the relative inefficient use of an existing scan line buffer.
Figure 4:
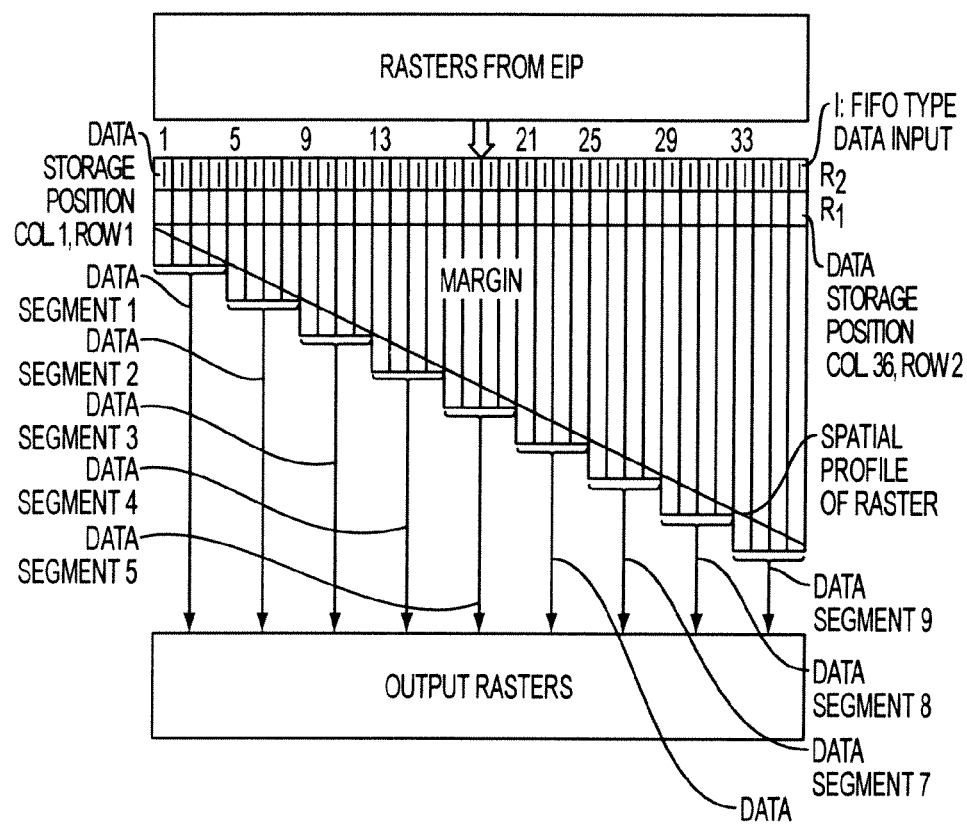
FIG. 4 is a schematic of a memory architecture for the leading edge of a page utilizing skew compensation according to an exemplary embodiment of this disclosure.
Figure 5:
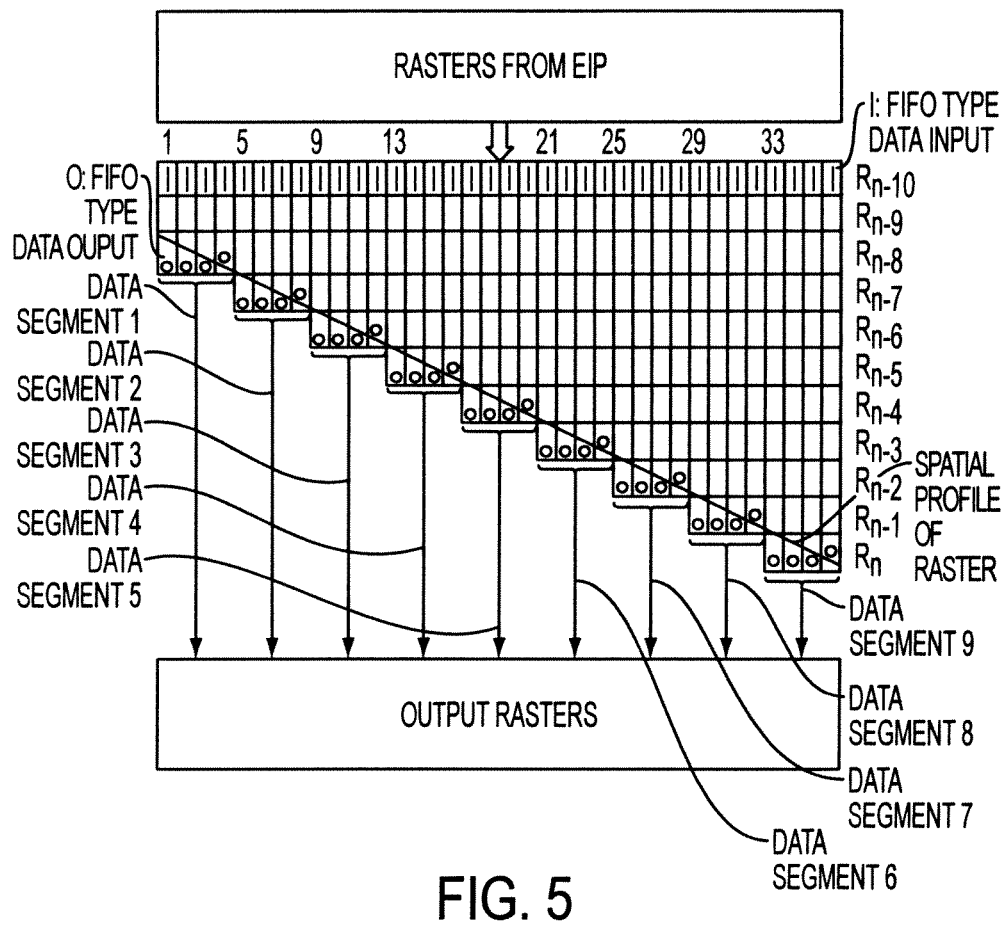
FIG. 5 is a schematic of a memory architecture for a mid-page skew compensation according to an exemplary embodiment of this disclosure.

Now is provided further details of the ER, FIFO type image processing methods, systems and apparatus disclosed. Again, to understand the value of the disclosure, consider that current ER methods store data that has been used and is no longer needed due to the spatial profile of the physical raster (see FIG. 3). The present method extracts raster lines from what is called the Electronic Image Path (EIP) and fills varying length FIFOs with the raster data. FIG. 4 shows a schematic of the FIFOs being filled near the start of a page for a skew compensation application. R1 represents raster line 1 and R2 represents raster line 2. The FIFO lengths are set as a function of the skew of the physical raster, which may be based on a mathematical model or based on actual measurements. At the beginning of a page, the FIFOs will contain "page margin data," for example, they contain non-marking values such as zero. As raster data is extracted from the EIP the raster data fills the FIFOs to their end, which is the point where the FIFO length corresponds to the physical raster line position for a given or predetermined number of column of pixels. For example, FIG. 4 illustrates a FIFO type data queuing configuration utilizing four columns of pixels per data memory segment. However, it is to be understood that the number of columns of pixels included in each data memory segment is not limited to any particular size. Ideally, the data memory segment will have a width that allows maximum memory usage given the resources available. Stated another way, electronic devices tend to operate with some data width, such as 8 bit chunks. FIFO memory is used most efficiently if the column widths are an integer number of these chunk widths, i.e., the bandwidth or natural size associated with the given electronics. Typical sizes are an integer power of 2 (1, 2, 4, 8, 16, . . . bits), but some electronic use other schemes, for example, widths that are multiples of 9 for 8 bits of data and 1 for parity. At the FIFO end points, the FIFO data is read into an output scan line buffer. FIG. 5 shows a schematic of the FIFOs being filled for a middle portion of a page for a skew compensation application.

In some image paths, the output scan line buffer can be used directly to drive an imager. For example, the data from the EIP could be binary and formatted to drive a laser scanner. Other image paths may require storing of several output scan line buffers, and those multiple buffers can be used to derive a final output scan line buffer to drive an imager. For example, if the data from the EIP is contone or a different resolution than used by a binary imager, a few lines may be needed about the physical raster to perform a fine interpolation to generate the final output data.

Figure 6:
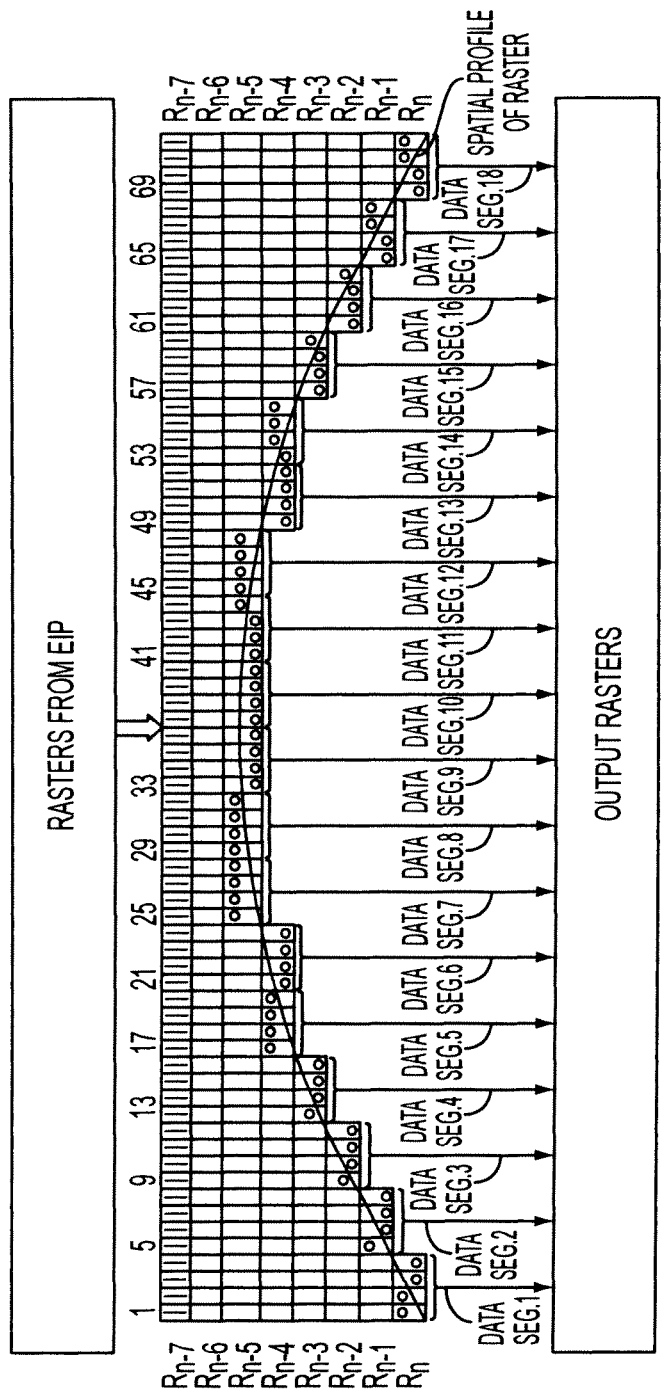
FIG. 6 is a schematic of a memory architecture for a mid-page bow compensation according to an exemplary embodiment of this disclosure.

The present architecture and data extraction method applies to general shape writing profiles. FIG. 6 shows an example of the method applying to compensation of bow in a laser scanner.

It should be understood that the architectural aspects of this disclosure as applied to a ROS based printing system can also be used with a multiple ink jet printing system where the FIFO type data configuration is designed to include discrete offsets to align data for multiple inkjet heads. For example, an inkjet system could have four inkjet heads with each inkjet head marking a 3" wide column of a media sheet. The inkjet system will need four inkjet heads to cover an 11" wide media sheet, i.e., page. In many inkjet printing architectures, the inkjet heads cannot be placed in a common row because of the associated supporting structure and electronics. Consequently, the inkjet heads are offset and may be positioned quite a distance from each other. Therefore, the printed raster data can be aligned by offsetting the raster data of each inkjet head by a discrete offset according to the disclosed FIFO methods and systems.

According to a second aspect of this disclosure, described below is an exemplary wedge FIFO memory architecture for aligning print data in a staggered print head/jet configuration. This disclosed memory architecture can provide a relatively low cost system for buffering scan line data for staggered print head/jet configurations where the heads/jets can be staggered by large distances in the process direction, e.g., 12 inches or more.

The disclosed inkjet system memory architecture efficiently stores and uses raster data for staggered print head/jet configurations. A FIFO type memory configuration is used where FIFOs of differing lengths are used to hold raster data, similar to the ROS system previously described. The FIFO length for a pixel column corresponds to the number of raster lines from the most upstream point of the physical raster to the point where the given pixel column intersects the physical raster. Data at the end of each FIFO is used to fill a raster line buffer that will be written by the physical rastering device, i.e. ink jet print heads.

Now is described an implementation of a representative inkjet printer system data including swizzle. Note, for purposes of this disclosure, swizzle is a term used for temporal alignment of the data to get the appropriate data to the jets, which is accomplished using the presently disclosed wedge FIFO algorithm which uses a wedge FIFO memory architecture and is suitable for realization within the resources available on "image source hardware." "Image source hardware" being sort of like a DFE (Digital Front End), but it doesn't do much processing. Image source hardware primarily serves data to the real-time image path in the printer, real time meaning operating on a fixed clock, due to the constant rate of pixels being printed.

The objective is to take an image delivered in scan-line order and deliver the time-shuffled data to the print head units appropriately, where a print head unit can comprise one or more print heads. This includes a buffering and start offset within a print head as well as a buffering required between print units within the same color group. The disclosed embodiments do not make a distinction between jet offset buffering, head-to-head offset buffering, and unit-to-unit offset buffering, as all alignment functions can be combined into one method.

Figure 7:
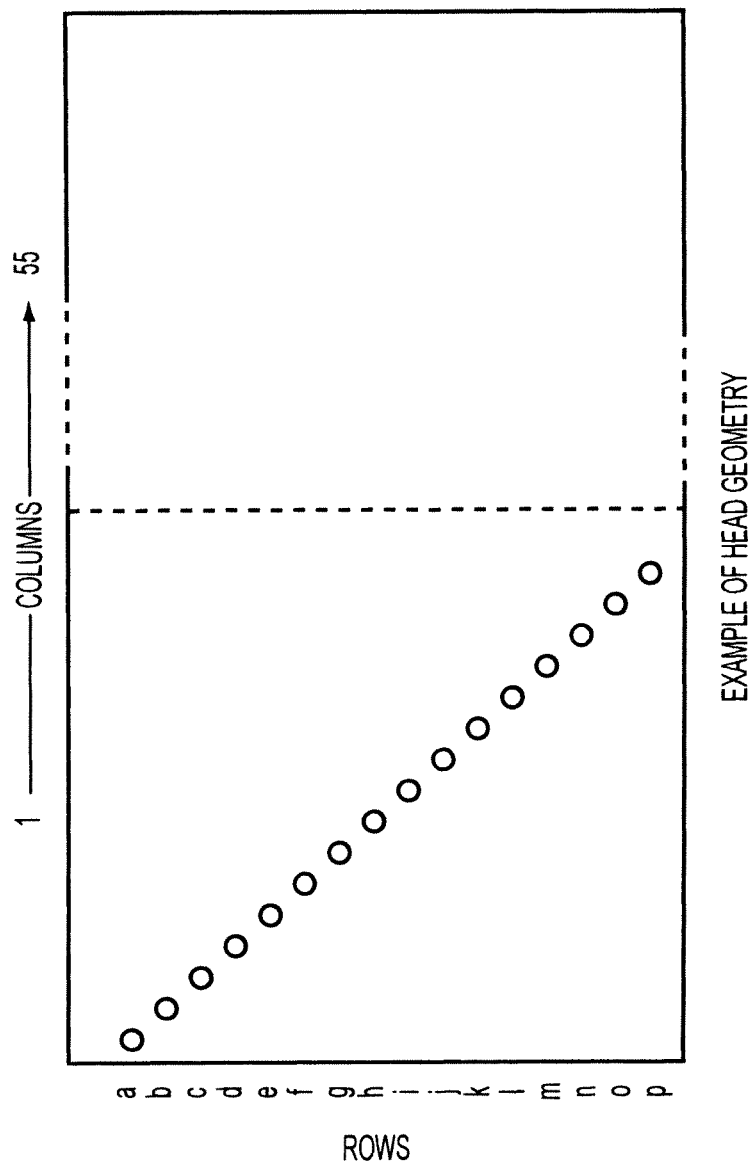
FIGS. 7-10 are various illustrations associated with an inkjet printing system according to an exemplary embodiment of this disclosure.

FIG. 7 shows one example of a reference scheme that is used to describe a print head. There are 16 rows labeled a-p which form a group that repeats 55 times across the head. All 55 jets in the same row will require the same buffer delay.

Figure 8:
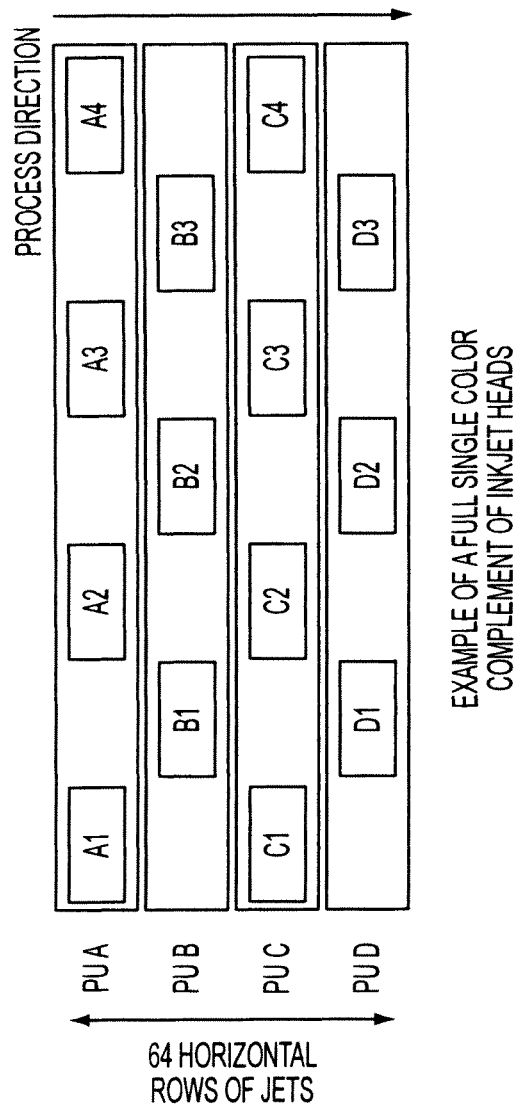

An example of a full single color complement (single color unit) of heads is shown in FIG. 8. Print Units A (labeled PU A) and C (PU C) have four heads, whereas units B (PU B) and D (PU D) only have three. All the jets in the same row and the same print unit require identical scan line offsets. This amounts to 64 independent offsets, (16 per print unit×4 print units) which corresponds to 64 independent buffers.

One aspect of the teachings in this disclosure provides methods to efficiently generate the exemplary 64 independent streams with sufficient buffering, such that by adding the appropriate lead margin to each results in the proper alignment in the process direction. Through all this, the data is available in the proper sequence and groupings for presentation to the print units.

Using exemplary numbers of jet, heads and units, the disclosed wedge type ink jet electronic registration process can be described as operating as follows:

(1) Break each incoming scanline into groups of 880 pixels (i.e. 55×16) destined to each print head. According to the above-described example, there are fourteen heads, thus fourteen modified FIFO buffers are used to hold the data.

(2) Accumulate the equivalent of at least 16 scanlines' worth of this data for each print head. Each print head will receive $1/14^{th}$ of all the pixels from a given scanline.

(3) Move sequentially (along the "scanline") pulling single pixels, grouping them into the appropriate one of 64 FIFO memories, each of which represents one of the 64 horizontal rows of jets that are created by the fourteen print heads. (Recall that each print head has 16 rows of jets, and the color unit is 4 print units high.)

(4) Note that so far, all of the scanline data is distributed such that it will be routed to the correct head and jet, but not at the correct time. This final step addresses and provides the necessary timing.

To satisfy each print unit's requests for a "line" (NOT a scanline, but rather the set of pixels needed for the instant in time when the print heads in that print unit fire its jets), a state machine, using a look-up table, will attempt to pull the required image data from the 16 FIFOs that hold the data for the heads in that print unit. However, at print start-up time, instead of actually pulling from the FIFO, margin generation circuits associated with each of the 16 FIFOs provide background (margin) data for a programmable number of lines which corresponds to the process-direction spacing of the rows of jets. It is this function which causes the image data to appear at the proper jet, at the proper time.

Figure 9:
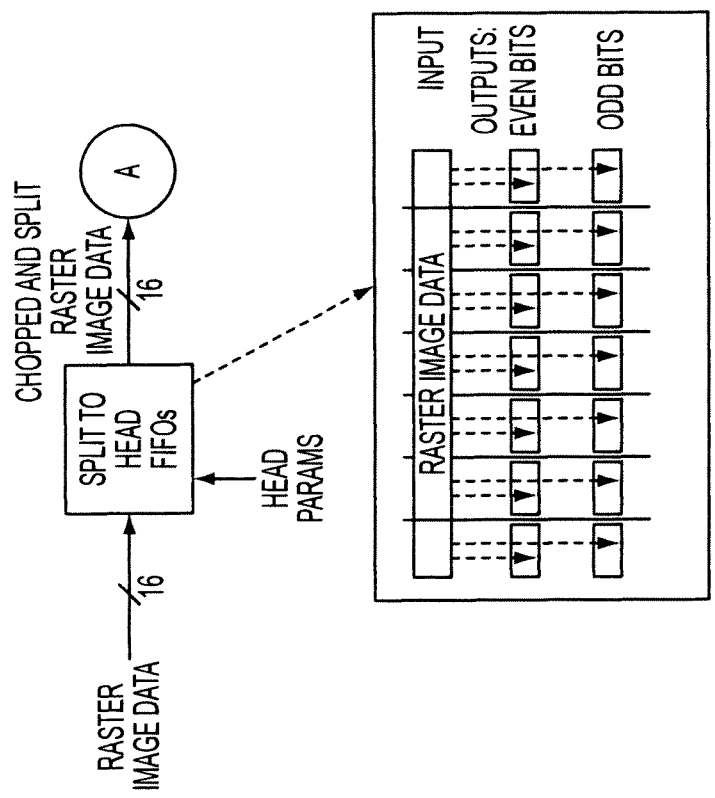
Figure 10:
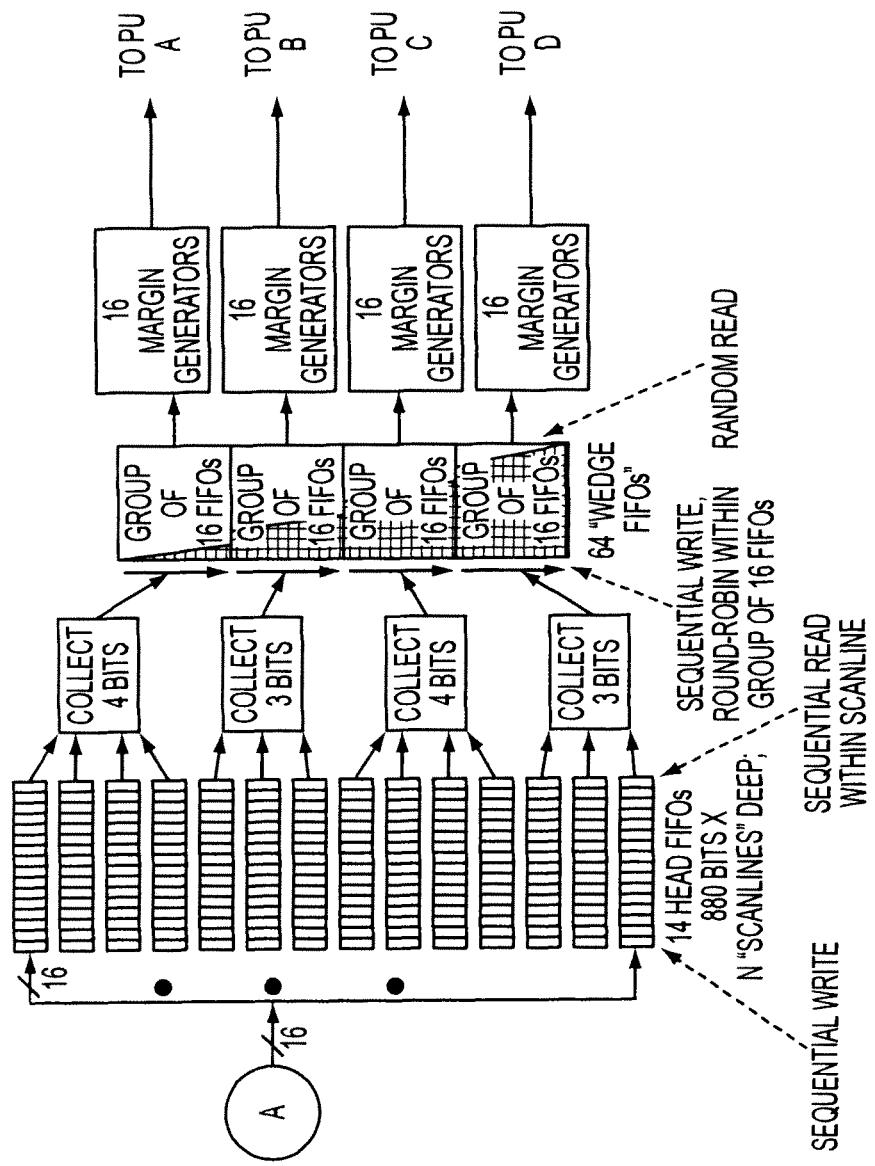

Described now is each function block in FIGS. 9 and 10 in the same sequence as they appear in the block diagrams. Note that the generic term "FIFO" is used frequently in this document. However, as previously indicated, in many cases this is just a shorthand name for a memory subsystem that has some FIFO-like properties, but also has other special read/write characteristics that go beyond the behavior of a traditional FIFO-style memory.

Referring to FIG. 9, the Split-to-Head-FIFOs block receives sequential scanlines and routes each pixel in the scanline to one of fourteen "Head FIFOs", which gather the data for each of the individual print heads. To first order, the split scheme is fairly simple. Referring back to FIG. 8, there are two types of splits that take place: first, a gross "macro" split that corresponds to the seven head positions across the scanline—that is the seven positions represented by head pairs A1C1, B1D1, A2C2, B2D2, A3C3, B3D3, and A4C4; second is a finer-grain, even/odd pixel split between A1&C1, B1&D1, A2&C2, etc. In any case, each downstream head FIFO ends up containing only the portion of each scanline that is destined for that particular head. A closer look at this block reveals that it also supports a horizontal shift between the even and odd heads.

Referring to FIG. 10, the fourteen head FIFOs act like traditional FIFOs on their inputs—that is, data presented to their inputs is automatically written to sequential locations in the buffer. Each FIFO holds 880 bits (pixels) of head data from at least 16 scanlines, for a total of at least 16×880 bits. Note that each print head has 880 jets. However, the output side of these FIFOs act as a combination of random-access memory and FIFO. Data read from the "FIFO" is presented sequentially in the scanline direction (like a FIFO), but the reader can also randomly select (within a range of about 0-12) which scanline the data will be read from (like a random-access memory).

There are 64 Wedge FIFOs, corresponding to the 64 horizontal rows of jets contained in the four print units. Each of the Wedge FIFOs gathers all of the pixels associated with a single horizontal row of jets, in the three or four print heads inside each print unit. Since each print unit has 16 horizontal rows of jets, the 64 Wedge FIFOs can be subdivided into four groups of sixteen (16) FIFOs, with each group corresponding to one of the four print units in a color group. The depth of each Wedge FIFO is proportional to the distance of its corresponding row of jets from the "leading edge" of the imaging process. Tables 1 and 2 give the memory requirements for the Wedge FIFOs, based on 600 and 1200 line-per-inch (lpi or dpi for dots per inch) printing resolution in the process direction. Data from the head FIFOs is written to the Wedge FIFOs in a simple, strictly-sequential order, in groups of three or four bits—one bit for each of the three or four heads in each print unit.

TABLE 1

Wedge FIFO Memory Requirements for 600 dpi

| Resolution (dpi): | 600 | | | | | | | |
|---|---|---|---|---|---|---|---|---|
| PU Pitch: | 4.14 inches | | 2484 scanlines | | | | | |
| Bits per "scanline": | 220 | | | | | | | |
| Jet row pitch: | 0.032 inches | | 19 scanlines | | | | | |

| | PU A | | PU B | | PU C | | PU D | |
|---|---|---|---|---|---|---|---|---|
| Jet Row Number: | Bits req'd | sl | Bits req'd | sl | Bits req'd | sl | Bits req'd | sl |
| 1 | 220 | 1 | 546700 | 2485 | 1093180 | 4969 | 1639660 | 7453 |
| 2 | 4400 | 20 | 550880 | 2504 | 1097360 | 4988 | 1643840 | 7472 |
| 3 | 8580 | 39 | 555060 | 2523 | 1101540 | 5007 | 1648020 | 7491 |
| 4 | 12760 | 58 | 559240 | 2542 | 1105720 | 5026 | 1652200 | 7510 |
| 5 | 16940 | 77 | 563420 | 2561 | 1109900 | 5045 | 1656380 | 7529 |
| 6 | 21120 | 96 | 567600 | 2580 | 1114080 | 5064 | 1660560 | 7548 |
| 7 | 25300 | 115 | 571780 | 2599 | 1118260 | 5083 | 1664740 | 7567 |
| 8 | 29480 | 134 | 575960 | 2618 | 1122440 | 5102 | 1668920 | 7586 |
| 9 | 33660 | 153 | 580140 | 2637 | 1126620 | 5121 | 1673100 | 7605 |
| 10 | 37840 | 172 | 584320 | 2656 | 1130800 | 5140 | 1677280 | 7624 |
| 11 | 42020 | 191 | 588500 | 2675 | 1134980 | 5159 | 1681460 | 7643 |
| 12 | 46200 | 210 | 592680 | 2694 | 1139160 | 5178 | 1685640 | 7662 |
| 13 | 50380 | 229 | 596860 | 2713 | 1143340 | 5197 | 1689820 | 7681 |
| 14 | 54560 | 248 | 601040 | 2732 | 1147520 | 5216 | 1694000 | 7700 |
| 15 | 58740 | 267 | 605220 | 2751 | 1151700 | 5235 | 1698180 | 7719 |
| 16 | 62920 | 286 | 609400 | 2770 | 1155880 | 5254 | 1702360 | 7738 |
| Memory required (bits) | 505,120 | | 9,248,800 | | 17,992,480 | | 26,736,160 | |
| Memory Required (bytes) | 63,140 | | 1,156,100 | | 2,249,060 | | 3,342,020 | |

TABLE 2

Wedge FIFO Memory Requirements for 1200 dpi

| Resolution (dpi): | 1200 | | | | | | | |
|---|---|---|---|---|---|---|---|---|
| PU Pitch: | 4.14 inches | | 4968 scanlines | | | | | |
| Bits per "scanline": | 220 | | | | | | | |
| Jet row pitch: | 0.032 inches | | 38 scanlines | | | | | |

| | PU A | | PU B | | PU C | | PU D | |
|---|---|---|---|---|---|---|---|---|
| Jet Row Number: | Bits req'd | sl | Bits req'd | sl | Bits req'd | sl | Bits req'd | sl |
| 1 | 220 | 1 | 1093180 | 4969 | 2186140 | 9937 | 3279100 | 14905 |
| 2 | 8580 | 39 | 1101540 | 5007 | 2194500 | 9975 | 3287460 | 14943 |
| 3 | 16940 | 77 | 1109900 | 5045 | 2202860 | 10013 | 3295820 | 14981 |
| 4 | 25300 | 115 | 1118260 | 5083 | 2211220 | 10051 | 3304180 | 15019 |
| 5 | 33660 | 153 | 1126620 | 5121 | 2219580 | 10089 | 3312540 | 15057 |
| 6 | 42020 | 191 | 1134980 | 5159 | 2227940 | 10127 | 3320900 | 15095 |
| 7 | 50380 | 229 | 1143340 | 5197 | 2236300 | 10165 | 3329260 | 15133 |
| 8 | 58740 | 267 | 1151700 | 5235 | 2244660 | 10203 | 3337620 | 15171 |
| 9 | 67100 | 305 | 1160060 | 5273 | 2253020 | 10241 | 3345980 | 15209 |

TABLE 2-continued

Wedge FIFO Memory Requirements for 1200 dpi

| | | | | | | | | |
|---|---|---|---|---|---|---|---|---|
| 10 | 75460 | 343 | 1168420 | 5311 | 2261380 | 10279 | 3354340 | 15247 |
| 11 | 83820 | 381 | 1176780 | 5349 | 2269740 | 10317 | 3362700 | 15285 |
| 12 | 92180 | 419 | 1185140 | 5387 | 2278100 | 10355 | 3371060 | 15323 |
| 13 | 100540 | 457 | 1193500 | 5425 | 2286460 | 10393 | 3379420 | 15361 |
| 14 | 108900 | 495 | 1201860 | 5463 | 2294820 | 10431 | 3387780 | 15399 |
| 15 | 117260 | 533 | 1210220 | 5501 | 2303180 | 10469 | 3396140 | 15437 |
| 16 | 125620 | 571 | 1218580 | 5539 | 2311540 | 10507 | 3404500 | 15475 |
| Memory required (bits) | 1,006,720 | | 18,494,080 | | 35,981,440 | | 53,468,800 | |
| Memory Required (bytes) | 125,840 | | 2,311,760 | | 4,497,680 | | 6,683,600 | |

Note that, at this point in the image path the image could still be printed by a single linear horizontal array of jets. That is, if all of the Wedge FIFOs began to supply their image data at the same time, the data would be available in the original raster scanline format. To put it another way—nothing (other than providing Wedge FIFOs with different depths) has been done yet that accounts for the difference in the vertical positions (parallel to the process direction) of the rows of jets. This row-by-row difference is created by 64 margin generation circuits which delay the reading of image data from each Wedge FIFO until the corresponding row of jets is in the proper position. The margin generators need only create this delay one time, when the printer is first cycled up. Each margin generator supplies background data (usually zeroes) until it is time to supply real image data from the Wedge FIFO. The margin generators can each supply an arbitrary number of background "scanlines". This number is programmed at run time.

Figures 11, 12:
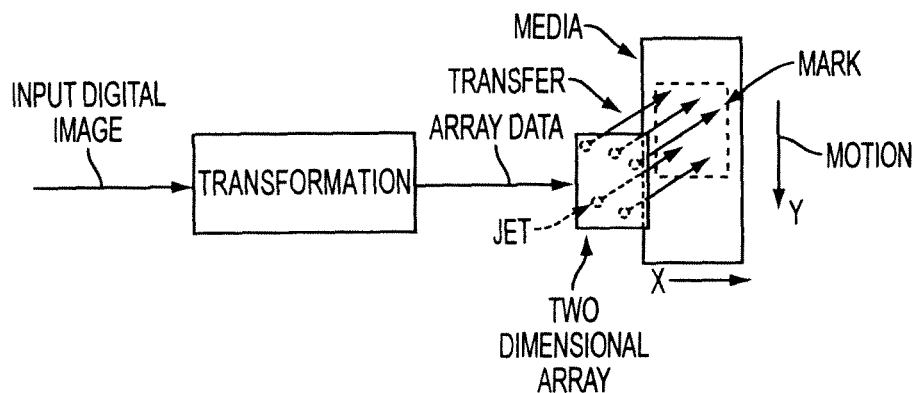
FIG. 11 is a block diagram of an inkjet head system according to one exemplary embodiment of this disclosure.
FIG. 12 is an example of a two-dimensional array of an input image according to an exemplary embodiment of this disclosure.

The diagram presented in FIG. 11 further illustrates the context around which the disclosed ink jet embodiment is contained. The context involves the transformation of an input digital image stream that is presented in sequential scan order to an array data stream suitable for driving the array of jets. The transform must appropriately condition the input digital image to achieve proper spatial reproduction onto the media. The disclosed FIFO method addresses the efficiency of memory usage within the transformation block.

It is to be understood that, substantively, the disclosed FIFO method provided a process to electronically register a rasterized image relative to the spatial profile of an ink jet rastering device, wherein the process includes:

a) receiving rasterized pixel line data for rendering on a substrate;

b) sequentially extracting one or more lines of the rasterized pixel line data to fill a FIFO type data queuing configuration including a plurality of FIFO type data memory segments, each data memory segment including a FIFO type data input which is filled by pixel line data associated with the last pixel line extracted from the rasterized pixel line data, a FIFO type data memory output associated with the oldest pixel line data of the respective data segment, and a predetermined number of FIFO type sequential data storage positions between the FIFO type data input and FIFO type data output, wherein the predetermined number of FIFO type sequential data storage positions is a function of the spatial profile of the physical rastering device;

c) outputting the rasterized pixel line data associated with the data memory segment FIFO type outputs to one of the ink jet rastering devices for rendering the image on the substrate, a process for further image processing and a device for further image processing; and d) sequencing in a FIFO manner the relative positions of the pixel line data associated with the plurality of data memory segments and repeating steps step b) and c).

Furthermore, it is to be understood that the spatial profile of the ink jet rastering device may be associated with a diagonal alignment of ink jets within the rastering device, an ink jet head-to-ink jet head offset associated with an ink jet rastering device including multiple ink jet printing heads, and an ink jet head unit-to-ink jet head unit offset associated with an ink jet rastering device including multiple ink jet head units.

Figure 13:
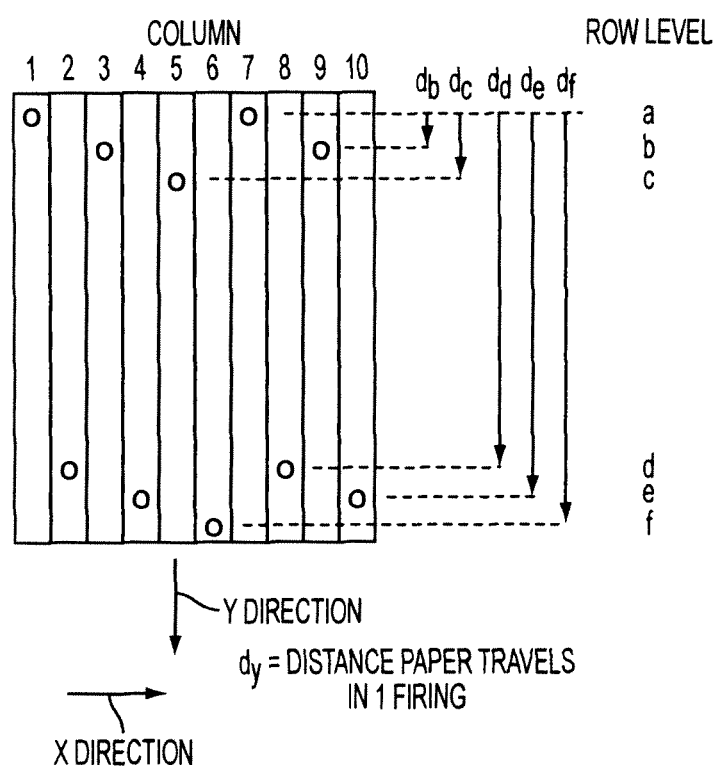
FIG. 13 is another example of the two-dimensional array of FIG. 12, providing details of the array geometry.

A representative example is used to help explain the required process. In this discussion the digital image of FIG. 12 is used. It is ten bits wide and ten scan lines long, followed by one or more images. The two-dimensional array used in this discussion is depicted in FIG. 13. A consumption of an input image scan line and a transfer to the media both occur at the same periodic rate. This rate coupled with the relative velocity in the Y direction between the array and the media makes for a gap of dy between firings on the media.

One fire of the array causes all jets that make up the array to transfer based on the value in the array data. The first scan line of the sample image (FIG. 12) forms a straight line in the X direction. In order for the line to be reproduced properly on the media, the jet in column 2 must not start to transfer its data until a distance dd has been advanced. Likewise for column 8, being it is at the same row level. Columns 3 and 9 will need to wait for db, and so on.

The number of transfer cycles to delay before starting to consume the data associated with a jet can be calculated by ROUND(drowlevel/dy). (Assuming the mechanism used can only register in dy increments). Without any optimization, each column would require a delay; in the case of this example 10 would be needed. Because an input scan line is being consumed on each transfer cycle, any data that does not get transferred is stored for later use. With this begins disclosed FIFO method.

An optimized FIFO (First-in-first-out) memory management scheme is utilized to achieve the required delays. Because a given FIFO element requires resource for the management of the memory as well as the amount of memory storage, the minimization of the number of FIFO elements and optimizing their memory storage requirements can prove advantageous. This leads to the following two observations.

1. Any jets on the same row level have the same delay, and therefore can share the same FIFO element and 2. Each FIFO element storage size need only be as large as the delay requires.

The disclosed FIFO method simply exploits these two observations to reduce implementation resources by grouping all data on the same row level into the same FIFO storage element, and tailor each individual FIFO storage sizes to their minimum.

In this example, the number of FIFO elements can be reduced to six, one for each row level. The storage size can be set for each FIFO element based on the calculated delay, with row level 'a' requiring no storage, and row level 'b' requiring ROUND($d_b/d_y$)×2 (number of bits at that level) bits of storage, and so on.

Below are examples of two possible processes to generate array data from an input data image.

Process A
1. Clear all Row Level FIFOs
2. Get input image scan line s
3. For each Row Level n: Gather input image data that maps to Row Level n and save in FIFO n.
4. If s is less than the required start delay for Row Level n: Use blank (no mark) data to generate its portion of the array data: Otherwise: Use FIFO n output to generate its portion of the array data.
5. Do transfer with generated array data.
6. Increment s and loop to step 2.

Alternate Flow B
1. Preload Row Level FIFO n with lead offset blank lines.
2. Get input image scan line s.
3. For each Row Level n: Gather input image data that maps to Row level n and save in FIFO n.
4. For each Row Level n: Use FIFO n output to generate its portion of the array data.
5. Do transfer with generated array data.
6. Increment s and loop to step 2.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method of electronically registering a rasterized image relative to a spatial profile of an ink jet rastering device, the method comprising:
   a) receiving rasterized pixel line data for rendering on a substrate;
   b) sequentially extracting one or more lines of the rasterized pixel line data to fill a FIFO type data queuing configuration including a plurality of FIFO type data memory segments, each data memory segment including a FIFO type data input which is filled by pixel line data associated with the last pixel line extracted from the rasterized pixel line data, a FIFO type data memory output associated with the oldest pixel line data of the respective data segment, and a predetermined number of FIFO type sequential data storage positions between the FIFO type data input and FIFO type data output, wherein the predetermined number of FIFO type sequential data storage positions is a function of the spatial profile of the physical rastering device;
   c) outputting the rasterized pixel line data associated with the data memory segment FIFO type outputs to one of the ink jet rastering devices for rendering the image on the substrate, a process for further image processing and a device for further image processing; and
   d) sequencing in a FIFO manner the relative positions of the pixel line data associated with the plurality of data memory segments and repeating steps step b) and c).

2. The method according to claim 1, wherein the ink jet rastering device is one or more ink jet heads.

3. The method according to claim 2, wherein one or more ink jet heads include a plurality of ink jets arranged diagonally.

4. The method according to claim 1, wherein each FIFO type data memory segment is associated with a respective pixel length and a respective pixel width, the pixel length defined as the number of sequential lines (rows) of the rasterized pixel line data associated with the respective FIFO type data memory segment and the pixel width defined as the number of pixels (columns) associated with respective ink jets aligned in a common row and
   the predetermined number of FIFO type sequential data storage positions is associated with the pixel length and pixel width as a function of the spatial profile of the ink jet rastering device.

5. The method according to claim 4, wherein one or more of the pixel length and the pixel width is determined as a function of a natural memory associated with the method.

6. The method according to claim 4, wherein the pixel width is one of 1, 2, 4, 8, 16, 32, 64, 128, 256.

7. The method according to claim 1, wherein step a) receives binary rasterized pixel line data.

8. The method according to claim 1, wherein step a) receives contone rasterized pixel line data and step c) outputs the contone rasterized pixel line data associated with the data memory segment FIFO type outputs to another process for generating binary output pixels.

9. The method of claim 1, wherein the ink jet rastering device is a plurality of inkjet heads, each ink jet head including a plurality of ink jets.

10. The method of claim 1, wherein the ink jet rastering device is a plurality of inkjet heads and the shape of the plurality of FIFO type data memory segments corresponding to the spatial profile of the ink jet rastering device is defined by one or more discrete offsets associated with the alignment of the ink jets within each ink jet head and the relative alignment of the ink jet heads.

11. The method of claim 1, wherein the spatial profile is associated with one or more of a diagonal alignment of ink jets, an ink jet head-to-ink jet head offset, and an ink jet head unit-to-ink jet head unit offset.

12. A printing apparatus for rendering an image on a substrate, the printing apparatus comprising:
   an EIP (Electronic Image Path) configured to receive rasterized pixel line data for rendering the image on the substrate;
   an ink jet rastering device configured to mark the substrate with the image, the ink jet rastering device including a plurality of ink jets arranged in a respective plurality of columns and rows to provide a spatial profile; and
   a controller operatively connected to the EIP and the ink jet rastering device, the controller configured to perform a process of electronically registering the rasterized image relative to the spatial profile of the ink jet rastering device, the process comprising:
   a) sequentially extracting one or more lines of the rasterized pixel line data to totally fill a FIFO type data queuing configuration including a plurality of FIFO type data memory segments associated with the plurality of ink jets, each data memory segment including a FIFO type data input which is filled by pixel line data associated with the last pixel line ink jet and extracted from the rasterized pixel line data, a FIFO type data output associated with the oldest pixel line data of the respective data memory segment, and a predetermined number of FIFO type sequential data storage positions between the FIFO type data input and FIFO type data output, wherein the predetermined number of FIFO type sequential data storage positions is a function of the spatial profile of the ink jet rastering device;

b) after the FIFO type data queuing configuration is full, outputting the rasterized pixel line data associated with the data memory segment FIFO type outputs to the ink jet rastering device for rendering the image onto the substrate; and c) sequencing in a FIFO manner the relative positions of the pixel line data associated with the plurality of data memory segments and repeating steps step a) and b).

13. The printing apparatus according to claim 12, wherein the ink jet rastering device is one or more ink jet heads, each ink jet head including a plurality of ink jets arranged diagonally.

14. The printing apparatus according to claim 12, wherein each FIFO type data memory segment is associated with a respective pixel length and a respective pixel width, the pixel length defined as the number of sequential lines (rows) of the rasterized pixel line data associated with the respective FIFO type data memory segment and the pixel width defined as the number of pixels (columns) associated with respective ink jets aligned in a common row, and the predetermined number of FIFO type sequential data storage positions is associated with the pixel length and pixel width as a function of the spatial profile of the ink jet rastering device.

15. The printing apparatus according to claim 14, wherein one or more of the pixel length and the pixel width is determined as a function of a natural memory associated with the method.

16. The printing apparatus according to claim 14, wherein the pixel width is one of 1, 2, 4, 8, 16, 32, 64, 128, 256.

17. The printing apparatus according to claim 12, wherein the spatial profile is associated with one or more of a diagonal alignment of ink jets, an ink jet head-to-ink jet head offset, and an ink jet head unit-to-ink jet head unit offset.

18. The printing apparatus according to claim 12, wherein the EIP is configured to receive binary rasterized pixel line data.

19. The printing apparatus according to claim 12, wherein the EIP is configured to receive contone rasterized pixel line data and step b) outputs the contone rasterized pixel line data associated with the data memory segment FIFO type outputs to another process for generating binary output pixels.

20. A printing apparatus controller comprising:

a non-transitory computer-usable data carrier storing instructions that, when executed by the controller cause the controller to perform a method of electronically registering a rasterized image relative to a spatial profile of an ink jet rastering device, the ink jet rastering device including a plurality of ink jets arranged in a respective plurality of columns and rows to provide the spatial profile method comprising:

a) receiving rasterized pixel line data for rendering on a substrate;

b) sequentially extracting one or more lines of the rasterized pixel line data to totally fill a FIFO type data queuing configuration including a plurality of FIFO type data memory segments associated with the plurality of ink jets, each data segment associated with a respective ink jet and including a FIFO type data input which is filled by pixel line data associated with the last pixel line extracted from the rasterized pixel line data, a FIFO type data output associated with the oldest pixel line data of the respective data memory segment, and a predetermined number of FIFO type sequential data storage positions between the FIFO type data input and FIFO type data output, wherein the predetermined number of FIFO type sequential data storage positions is a function of the spatial profile of the ink jet rastering device;

c) after the FIFO type data queuing configuration is full, outputting the rasterized pixel line data associated with the data memory segment FIFO type outputs to the ink jet rastering device for rendering the image on the substrate; and d) sequencing in a FIFO manner the relative positions of the pixel line data associated with the plurality of data memory segments and repeating steps step b) and c).

21. The printing apparatus controller according to claim 20, wherein each FIFO type data memory segment is associated with a respective pixel length and a respective pixel width, the pixel length defined as the number of sequential lines (rows) of the rasterized pixel line data associated with the respective FIFO type data memory segment and the pixel width defined as the number of pixels (columns) associated with respective ink jets aligned in a common row, and the predetermined number of FIFO type sequential data storage positions is associated with the pixel length and pixel width as a function of the spatial profile of the ink jet rastering device.

22. The printing apparatus controller according to claim 20, wherein one or more of the pixel length and the pixel width is determined as a function of a natural memory associated with the method.

23. The printing apparatus controller according to claim 22, wherein the ink jet rastering device is one or more ink jet heads, each ink jet head including a plurality of ink jets arranged diagonally.

24. The printing apparatus controller according to claim 22, wherein the pixel width is one of 1, 2, 4, 8, 16, 32, 64, 128, 256.

25. The printing apparatus according to claim 20, wherein the spatial profile is associated with one or more of a diagonal alignment of ink jets, an ink jet head-to-ink jet head offset, and an ink jet head unit-to-ink jet head unit offset.

* * * * *